United States Patent
Deteresa et al.

(10) Patent No.: US 6,592,979 B1
(45) Date of Patent: Jul. 15, 2003

(54) HYBRID MATRIX FIBER COMPOSITES

(75) Inventors: Steven J. Deteresa, Livermore, CA (US); Richard E. Lyon, Absecon, NJ (US); Scott E. Groves, Brentwood, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/506,428

(22) Filed: Feb. 17, 2000

Related U.S. Application Data

(63) Continuation-in-part of application No. 08/905,559, filed on Aug. 4, 1997, now abandoned.

(51) Int. Cl.⁷ .............................................. B32B 18/00
(52) U.S. Cl. ................. 428/293.4; 428/293.1; 428/297.4; 428/298.1; 428/301.4; 428/332; 428/364; 428/374; 428/375; 428/396
(58) Field of Search ................. 428/287, 284, 428/286, 290, 293.1, 293.4, 293.7, 294.7, 297.4, 298.1, 300.1, 301.4, 332, 364, 374, 375, 396

(56) References Cited

U.S. PATENT DOCUMENTS

| | | | | |
|---|---|---|---|---|
| 4,532,169 A | * | 7/1985 | Carley ......................... | 428/109 |
| 4,764,397 A | * | 8/1988 | Fischer et al. .............. | 428/269 |
| 4,925,729 A | * | 5/1990 | O'Connor ................... | 428/245 |
| 4,936,186 A | | 6/1990 | Sekido et al. .................... | 87/8 |
| 4,992,318 A | * | 2/1991 | Gadkaree .................... | 428/114 |
| 5,085,928 A | * | 2/1992 | Krueger ....................... | 428/287 |

* cited by examiner

*Primary Examiner*—Merrick Dixon
(74) *Attorney, Agent, or Firm*—James S. Tak; Alan H. Thompson

(57) ABSTRACT

Hybrid matrix fiber composites having enhanced compressive performance as well as enhanced stiffness, toughness and durability suitable for compression-critical applications. The methods for producing the fiber composites using matrix hybridization. The hybrid matrix fiber composites include two chemically or physically bonded matrix materials, whereas the first matrix materials are used to impregnate multi-filament fibers formed into ribbons and the second matrix material is placed around and between the fiber ribbons that are impregnated with the first matrix material and both matrix materials are cured and solidified.

18 Claims, 5 Drawing Sheets

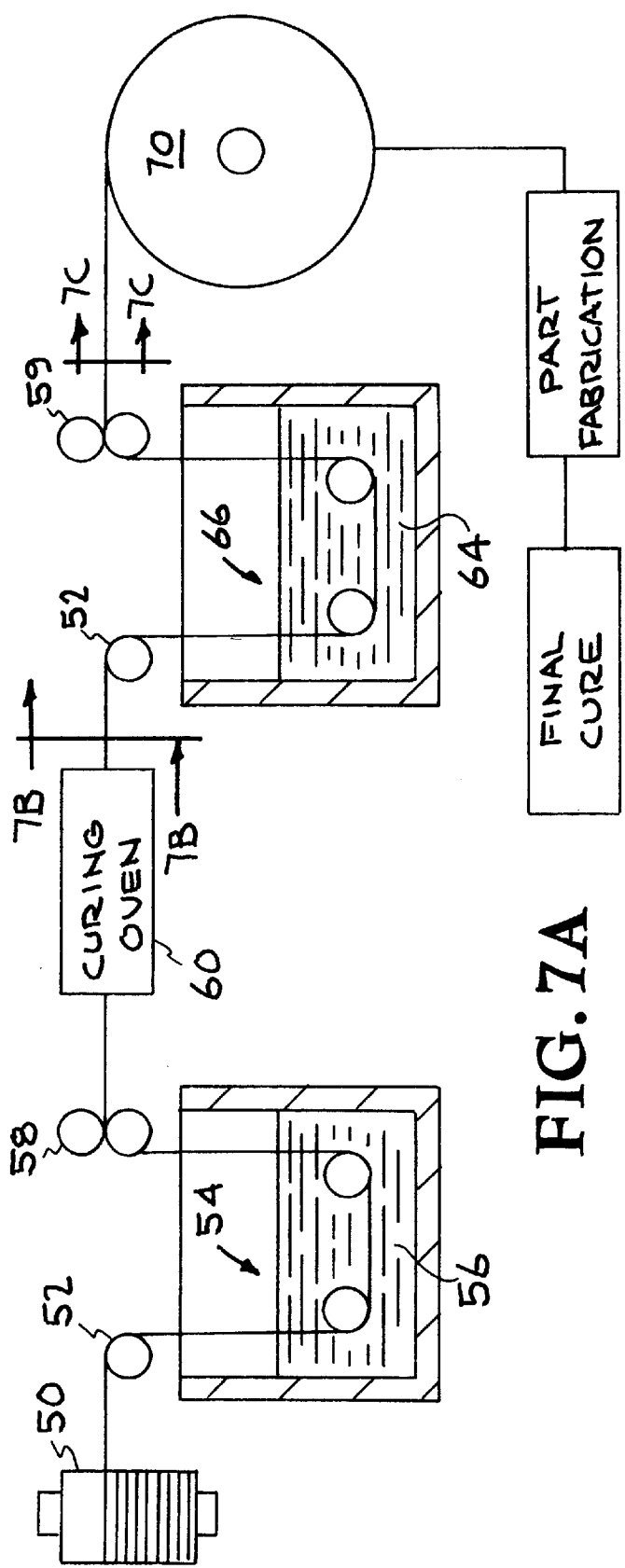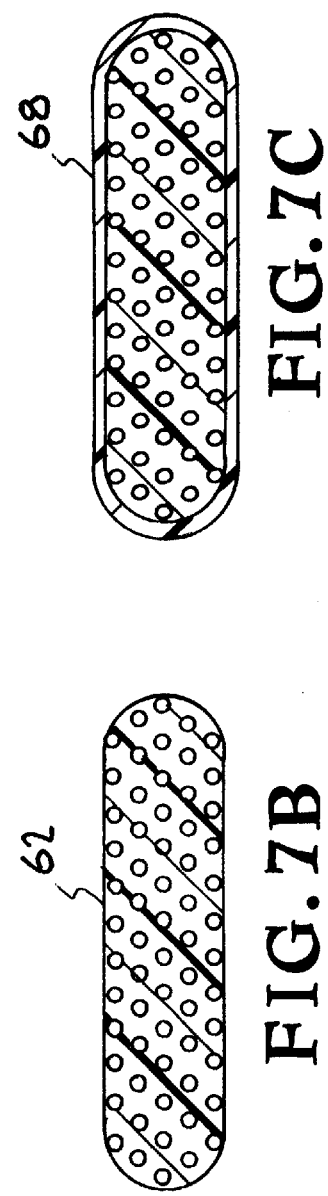
FIG. 7A
FIG. 7B
FIG. 7C

HYBRID MATRIX FIBER COMPOSITES

This Application is a continuation-in-part of U.S. patent application Ser. No. 08/905,559, filed Aug. 4, 1997, now abandoned. Such application is incorporated herein by reference.

The United States Government has rights in this invention pursuant to Contract No. W-7405-ENG-48 between the U.S. Department of Energy and the University of California, for the operation of the Lawrence Livermore National Laboratory.

BACKGROUND OF THE INVENTION

1. Field of Invention

This invention concerns hybrid matrix fiber composites having improved compressive performance suitable for compression-critical applications as well as improved stiffness, toughness, and durability. The composites are fabricated by hybridization of two matrix materials. In particular, the invention concerns the composites comprised of a component fabricated from a plurality of fibers positionally aligned into a tape and impregnated with a first matrix material cured or otherwise solidified to appropriate stiffness and compression strength, and from the tape embedded in and surrounded by a second matrix material that acts as a binder to hold the tape together and is cured to appropriate toughness. The composite is used alone, or in combination or laminated with other structural materials. The invention further concerns a method and process for fabrication of the hybrid matrix fiber components.

2. Background Art and Related Art Disclosures

In aerospace, transportation, military and other industries, there is a continuous need for lightweight and durable structures having high performance in compression-critical applications, for construction and protection of various articles and structures, for insulation and for other uses.

At present, nearly all fiber composite materials are fabricated using multi-filament fiber tows and at most a single matrix material. The tows are comprised of thousands of filaments having diameters in the range of 5 $\mu$m to 100 $\mu$m and typically 5 $\mu$m to 15 $\mu$m. Processes used to fabricate useful structures from fiber composites typically involve placement ("impregnation") of a single matrix material precursor within and between the fiber tows. The flow of the matrix material precursor between filaments and around tows can lead to the formation of microstructural defects such as poor filament distribution and poor fiber alignment. Where composite fibers are not aligned, the composite lacks the maximum achievable stiffness and compression strength.

Various fiber-reinforced materials have been available and previously disclosed. However, these materials are made of a single matrix, at most, and, thus, may possess the undesirable defects and properties just described.

Several-fiber-reinforced articles of manufacture include only a single matrix surrounding the reinforcement fibers. For example, in U.S. Pat. No. 4,764,397, a fiber composite is formed by applying a matrix consisting of a blend (mixture) of aromatic and thermoplastic polymers to reinforcing fibers and the plastic matrix is cross-linked. U.S. Pat. No. 5,324,563 describes composite rods comprised of carbon fiber and a single, fully cured or solidified, matrix material. This material seems to have enhanced compressive strength but has not-enhanced toughness. The described rods are pultruded shaped composites of relatively large circular cross-section and these are primarily used as a structural member but not as a form of reinforcement to be bonded together.

In some fiber-reinforced articles of manufacture, the fiber-matrix composition is covered with layers of other materials. U.S. Pat. No. 5,085,928 concerns a fiber reinforced composite matrix consisting of unidirectional fibers alternating with porous spunlaced fibrous layers. All of the layers are embedded in a thermoplastic resin. Similarly, U.S. Pat. No. 4,532,169 discloses fiber matrix layers that are placed in contact with other layers of fibrous material. In this patent, high-performance fiber ribbons are impregnated with a single matrix material that is not cured or solidified while the fiber is tensioned.

U.S. Pat. No. 4,992,318 describes ceramic matrix composite products made of long reinforcing fiber layers and short reinforcing chopped fiber or particulate layers. The layers are placed in alternating arrangement to provide both high interlaminar shear strength and also high transverse strength. While the layered configuration of these fiber articles seems to provide enforced toughness, it does not provide enhanced compressive strength and stiffness.

All the above cited patents concern single matrix composites which do not provide the needed combination of durability, stiffness, and compressive performance for many structural applications.

It is, therefore, a primary object of this invention to provide a lightweight, rigid, strong, tough, stiff and durable material able to withstand high compressionstresses. The fiber composite according to the invention has all of the described properties.

All publications, patents and patent applications cited in the specification are hereby incorporated by reference in their entirety.

SUMMARY OF THE INVENTION

One aspect of the current invention concerns hybrid matrix fiber composites having improved compressive performance suitable for compression-critical applications as well as improved toughness, stiffness, and durability. The composites are produced by hybridization of two matrix materials wherein a component fabricated from a plurality of fibers positionally aligned into a ribbon, i.e., a sheet-like or ribbon-like shaped composite, is impregnated with a first matrix material and cured or otherwise solidified to appropriate stiffness and compression strength, and the ribbons are then coated by a second matrix material acting as a binder that holds the ribbons together.

Another aspect of the current invention is a hybrid matrix fiber composite wherein the first matrix provides a composite having a compressive strength and stiffness through impregnated fibers aligned into a ribbon, and the second matrix placed between the ribbons provides the hybrid composite with fracture toughness. The first and second matrix materials are chemically or physically bonded together to form the composite.

Another aspect of the current invention is a method for manufacturing hybrid matrix fiber composites wherein a plurality of fibers are impregnated in a first matrix material and cured to partially or fully solidify the first matrix material around the aligned fibers to form a ribbon. A plurality of ribbons are parallelly positionally aligned and coated with a second matrix material, and the second matrix material is cured or otherwise solidified to form chemical or physical bonds between the two matrices.

Another aspect of the current invention is a process for manufacturing a hybrid matrix fiber composite comprising steps:

(a) producing a component comprising a plurality of fibers by:

(i) impregnating the fibers in the first matrix materials;
(ii) aligning said fibers by tensioning; and
(iii) curing, partially curing, or otherwise solidifying the first matrix material around the aligned fibers to form a ribbon;
(b) aligning a plurality of ribbons evenly within a second matrix material; and
(c) curing or otherwise solidifying the first and second matrix materials to form chemical or physical bonds between the two matrixes.

Still another aspect of the current invention is a hybrid matrix fiber composite having a compression strength of at least about $2 \times 10^5$ psi, a stiffness of at least about $6 \times 10^6$ psi and a toughness ($G_{IC}$) of at least about 500 J/m².

BRIEF DESCRIPTION OF DRAWINGS

FIG. 7 depicts one typical processing sequence for production and manufacturing of hybridized matrix composites.

DEFINITIONS

Figure 1:
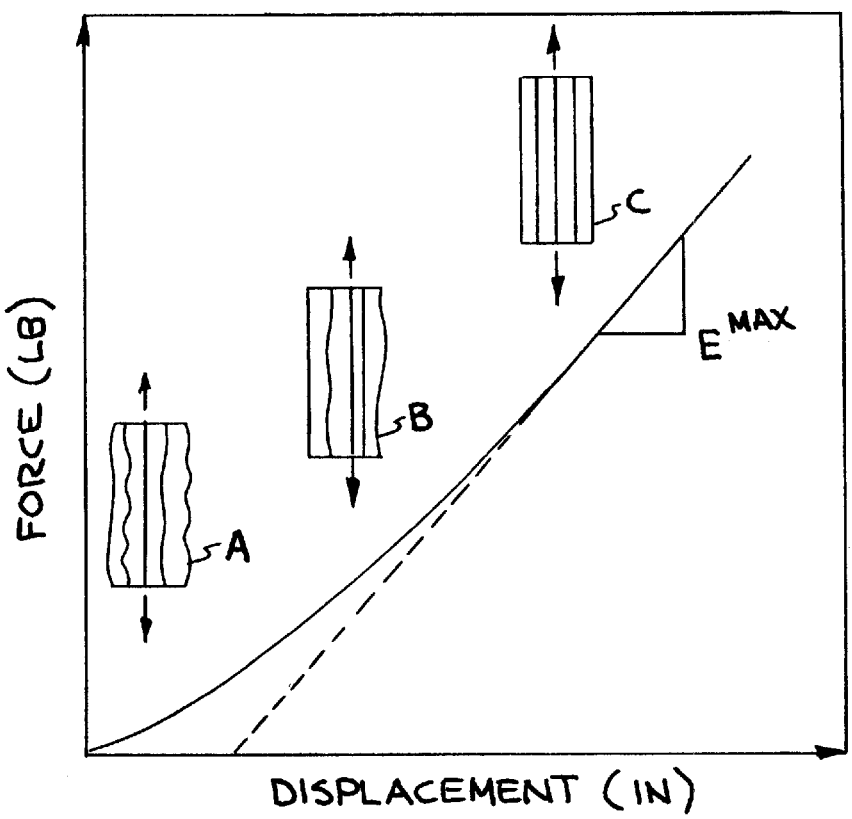
FIG. 1 is a graph showing the effects of tensioning on the stiffness of fiber tows.

As used herein:

"Fiber" means a continuous filament which is strung together with many others to make a fiber tow. Fiber materials and sources thereof are listed in Table 1.

"Glass fibers" means filaments of inorganic (vitreous) amorphous materials.

"Carbon fibers" means filaments of predominantly carbon.

"Fiber tow" means a multiplicity of filaments generally aligned.

"Filament" means a very fine continuous fiber made of, for example, carbon, boron, glass or quartz, aramid, ceramic polymer and the like.

"Ribbon" means multiple straightened and aligned filaments bound together with a matrix material to form a continuous reinforcing material having a usually rectangular cross-section. The ribbon is thin in comparison to its breadth (width) and length.

"Curing the matrix" means causing a chemical reaction, usually through the application of heat, which solidifies a thermosetting polymer matrix.

"Rod" means multiple straightened and aligned filaments bound together with a matrix material to form a continuous reinforcing material having a circular cross-section.

"First matrix material" means material used to bind filaments within a ribbon.

"Second matrix material" means material used to bind ribbons and other reinforcement to form a structure.

"Hybrid matrix composite" means a structure such as a composite made of the reinforcing ribbon, which contains the first matrix material, which is bound together by the second matrix.

"Preimpregnated tape" means commercially available product in the shape of tape which has been preimpregnated with the first matrix material in the uncured state.

"Dry fabric" means any fabric having a woven structure. Dry fabric may be used as one of the layers within or on the surface of a composite.

"RTM" means resin transfer molding which is a standard molding technique.

"$G_{IC}$" means mode I fracture energy.

"psi" means pounds per square inch.

"HMC" means a hybrid matrix composite.

"Pultrusion" means continuous pulling of impregnated fiber tows through heated dies to simultaneously shape and solidify ribbons and rods.

"Off-axis reinforcement" means fiber oriented away from the axis of the ribbons.

"Tow" means plurality of filaments or fibers in close association with each other.

"Reinforcement packing fraction" means the volume percentage of the composite occupied by the reinforcement material within the hybrid matrix composite, e.g., the volume percentage of ribbons within the hybrid matrix composite.

"Stiffness" means the stiffness of the composite defined by the slope of the force applied v. tensile elongation of the composite.

"Tensile elongation" means elongation under tension and is measured in inches.

"Tensile strength" is measured in pounds per square inch.

"Compression strength" is measured in pounds per square inch.

"Modulus" is used as an expression for stiffness when tensile stress, instead of force, and tensile strain, instead of elongation, are used to define the slope.

"Thermoplastic" or "TP" means meltable matrix materials, such as polysulfones, polyamides, polyarylether ketones or other materials listed in Table 3.

"Thermosetting" or "TS" means the matrix that solidifies due to a chemical reaction. Thermosetting materials are listed in Table 2.

"Setting" means solidifying.

DETAILED DESCRIPTION OF THE INVENTION

The current invention provides hybrid matrix fiber composites and methods for their fabrication wherein the fiber composites have predetermined properties such as compressive strength, stiffness, and toughness. These properties are due to hybridization and chemical bonding of two matrix materials, each imparting certain improved properties on the resulting composite having all these properties.

The composites are comprised of a component fabricated from a plurality of fibers positionally aligned into ribbons and impregnated with a first matrix material cured or otherwise solidified to an appropriate stiffness and compression strength, and from the aligned ribbons that are coated by a second matrix material acting as a binder to hold the ribbons together. The composite is used as such or, preferably, in combination or laminated with reinforced materials such as dry fabric and conventional preimpregnated tape.

Briefly, the hybrid matrix fiber composites comprise several materials bonded together. First, the fibers, preferably in the form of fiber tow, which are composed of filaments, are aligned under tension and then impregnated with the first matrix material. This is most easily done using pultrusion, filament-winding, or prepregging processes whereby one or more tows are pulled through a resin impregnation bath to fully coat all filaments with the first matrix material, tensioned using standard rollers and tensioning devices to align and fully straighten the filaments in each tow, shaped by pulling through a die or over rollers, and then formed into a solid ribbon by curing or otherwise solidifying the first matrix material. An important step of this invention process is to maintain the tension on the tows during the solidification of the first matrix material in order to lock in the alignment and straightness of the filaments, thereby achieving desirable strength and stiffness properties for the ribbon. The first matrix material is selected to impart high compression strength to the ribbon. Usually this requires the matrix material to exhibit high stiffness and strength.

Ribbons so formed is then used as an improved reinforcement in combination with a second matrix material and other prior art forms of reinforcement to produce useful structures having improved mechanical properties. The second matrix material is used to bind the ribbons and other forms of reinforcement together. The second matrix material is selected to provide toughness and durability to the composite, and to form a strong bond to the first matrix material within the ribbon. There are several methods that can be used to incorporate the reinforcing ribbon of the current invention into composite structures. These include laminating, molding, filament winding and pultrusion processes.

Typical fiber composite processing, such as described for example, in *Engineered Materials Handbook*, Vol 1., Composites, Ed. C. A. Dostal, ASM International, Metals Park, Ohio (1987), hereby incorporated by reference, is suitable for fabrication of the composites of the invention. Any variation of the above processes are intended to be within the scope of the invention.

Enhanced properties of the composites of the invention are due to selection of the fiber material, which are typically glass, boron, quartz, carbon or other high-performance fibrous materials such as silicon carbide or ceramic listed in Table 1.

TABLE 1

| Fiber Materials | | |
| --- | --- | --- |
| Type | Supplier | Fiber Carbon |
| Glass | Akzo, Fortafil Fibers, Inc. Amoco Performance Products, Inc. Grafil Inc. RK Carbon Fibers, Inc. Zoltek Corp., Carbon Fibers Div. Fiberglass Industries, Inc. JPS Glass and Industrial Fabrics Owens-Corning Fiberglass Corp. | |
| Quartz | JPS Glass and Industrial Fabrics Quartz Products, Inc. | |

TABLE 1-continued

| Fiber Materials | | |
| --- | --- | --- |
| Type | Supplier | Fiber Carbon |
| Boron | Americom Kaiser Vam Textron Specialty Materials, Inc. | |
| Silicon Carbide | Americom Atlantic Research Corp. 3M Co. Textron Specialty Materials, Inc. | |
| Ceramic | Cytec Engineered Materials 3M Co. | |

Although first matrix materials may include thermoplastic material, the first matrix materials are typically thermosetting materials, such as liquid epoxy resin, polyesters, vinylesters, cyanate esters, bismaleimides, polyimides, listed in Table 2.

TABLE 2

| Thermosetting Materials | | |
| --- | --- | --- |
| Type | Supplier | Matrix Epoxy |
| Bismaleimide | Ciba Giegy Corp. Dow Chemical Co. Shell Chemical Co. Ciba Polymers Hexcel Corp. Shell Chemical Co. | |
| Cyanate Ester | Ciba Polymers Hexcel Corp. | |
| Polyesters | ICI Americas Shell Chemical Co. | |
| Vinyl Esters | Dow Chemical Co. | |

Although any materials that impart toughness to the hybrid matrix composite can be utilized as a second matrix material, including thermosetting materials, usually the second matrix materials are thermoplastic materials selected from polyarylether ketones, epoxies, polyamide-imides, polysulfones, polyamides, and other materials listed in Table 3.

TABLE 3

| Thermoplastic Materials | | |
| --- | --- | --- |
| Matrix Type | Supplier | Polyami |
| de | Cytec Engineered Materials Polymer Composites, Inc. | |
| Polyamide-imide | Ciba Polymers Cytec Engineered Materials | |
| Polyarylene ketone | EGC | |
| Polyarylene sulfide | Norton Performance Plastics Corp. | |
| Polyetherimide | Cytec Engineered Materials Norton Performance Plastics Corp. | |
| Polyether ketone | Cytec Engineered Materials Norton Performance Plastics Corp. | |
| Polyethersulfone | Cytec Engineered Materials Norton Performance Plastics Corp. | |
| Polyimide | Ciba Polymers Cytec Engineered Materials EGC | |
| Polyphenylene sulfide | EGC Norton Performance Plastics Corp. | |

The first matrix material is selected to provide a high compression strength and stiffness to the ribbons. The second matrix material is selected to provide toughness, durability and also add to the strength and stiffness of the composite fabricated from the ribbons embedded in the second matrix material.

Both matrix materials are solidified in such a way that chemical or physical bonds are formed between the first and the second matrix material resulting in a unique hybrid matrix composite having substantially improved properties when compared to composites formed solely from a single matrix material. Such bonding of matrices and alignment of fibers confers on the hybrid matrix composites high compressive performance, improved stiffness, fracture toughness, and durability. These and other advantages are achieved through the synergistic effect of combining two different matrix materials with aligned fiber reinforcements.

Composites fabricated according to the invention may be manufactured in any shape and size suitable in their intended use. They are used as such or, typically, are used as one component of multilayer materials, as seen in FIG. 6. In such a case the care is taken to assure that the second matrix material is compatible with the other used materials and will bond with them. The complex composites are shown in FIG. 6B.

The hybrid matrix composite layers provide high compression strength, high stiffness and toughness. Although the hybrid matrix composite layers shown in FIG. 6B are comprised of highly aligned ribbons, other cross-sectional shapes, such as circular rods and ovals, are also possible.

Figure 6A:
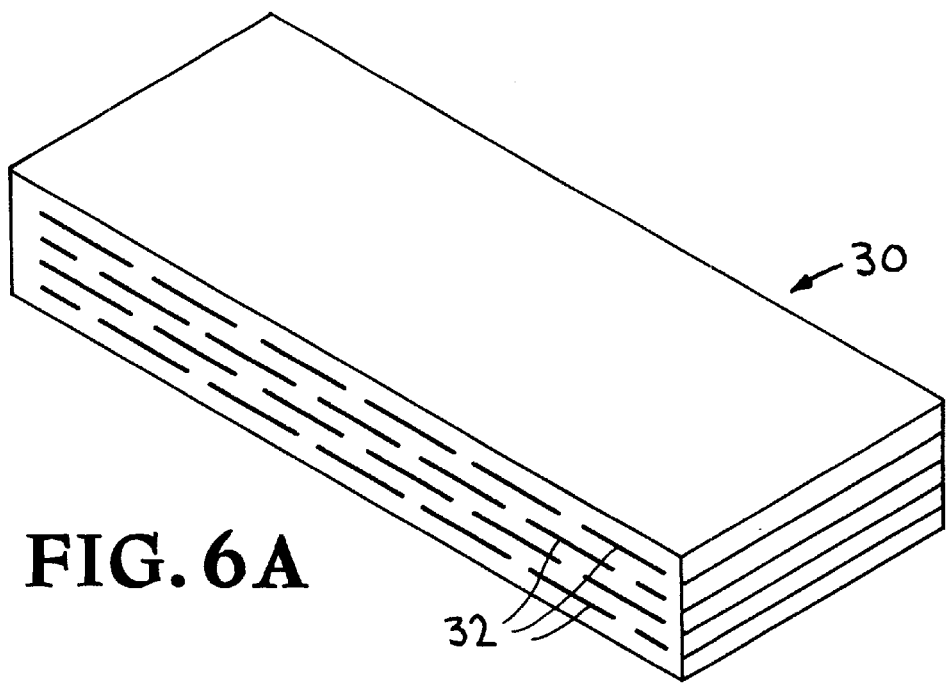
FIG. 6 depicts a sheet or lamina of a hybridized matrix composition alone (FIG. 6A) or with other commercially available reinforcement layers according to the present invention (FIG. 6B).
Figure 6B:
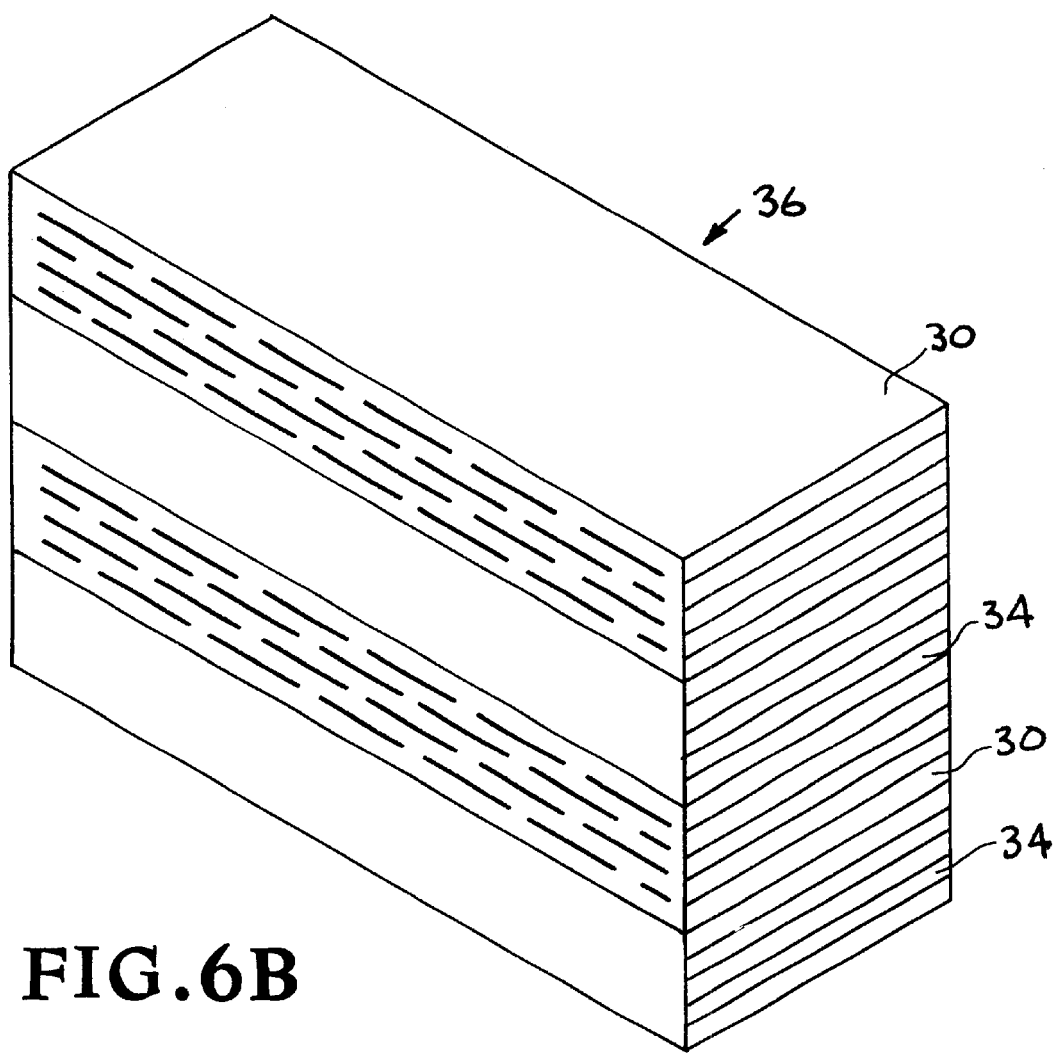

The laminated structure of multilayers seen in FIG. 6B is the basis for a wide variety of structural parts made by different fabrication methods. A great number of layer orientations and stacking sequences for the hybrid matrix composite layers and state-of-the-art fiber-reinforced layers are possible and are within the scope of the invention. For instance, since the rigid ribbons are lightweight and make excellent tensile reinforcements, the combination of enhanced compressive properties and tensile properties in a precured ribbon form is especially useful for the fabrication of weight critical structures. The precured ribbons can be readily bonded to any number of preshaped core materials, including foams, plastic and metal honeycombs, wood, as well as other precured shapes of composites. Strong, multiple composite materials are obtained by reinforcing the lighter, lower-strength core materials with the highly aligned ribbons which have of enhanced compressive and tensile properties.

I. Hybrid Matrix Components

The methods of the present invention are versatile in that fiber composites having preselected desired properties are obtained by choosing the fiber and matrix materials and matrix solidifying conditions to achieve desired compression strength, stiffness, and toughness.

A hybrid matrix composite comprises a plurality of ribbons of composite material impregnated in a first matrix material held in close association by parallel positioning alignment of ribbons with each other, embedded in a second matrix material. At the core of the hybrid matrix composites of the present invention are ribbons made of aligned reinforcement fibers composed of numerous filaments.

The filaments typically have a diameter from about 1 to about 100 $\mu$m, usually between 5–15 $\mu$m. The hybrid matrix composites are not limited as to the type of fibers and fiber materials as long as the fibers have strengthening and stiffening properties, can be aligned by pulling in tension, and are capable of being held in alignment within a solidified matrix material.

The ribbons have a thickness greater than 0.01 inches and usually from about 0.001 to about 0.1 inches, or more, and a width greater than 0.1 inch and usually from about 0.25 inches to about 12 inches, however, wider sheet-like widths can be utilized. The width is limited only by the capability of the processing equipment used to make the ribbons. A width-to-thickness ratio of at least 10:1 is common for the ribbons. It is to be understood, however, that the actual dimensions of the ribbons will depend on their intended use.

Circular cross-section rods have improved compressive strength properties resulting from the enhancement of the filament alignment and effective diameter of the reinforcement phase, especially in comparison to a prior art single fiber composites. Resistance to compressive buckling of the reinforcement is proportional to the fourth power of its radius. Consequently, a large diameter rod reinforcement provides enhanced compressive properties of the composite.

In the preferred embodiment, the aligned fibers impregnated with a solidified first matrix material are shaped into ribbons to provide for an enhancement in reinforcement packing fraction. Reinforcement packing fractions attainable by prior art methods are only 60–70% by volume. And in contrast to lower reinforcement packing fractions (i.e., less than 70%) of hybrid matrix composites containing rods, the reinforcement packing fractions of the inventive hybrid matrix composites containing ribbons are at least or greater than 90% by volume, and can even be higher than 95%. Additionally, the higher surface area of the ribbons (compared to, for instance, the rods) allows for enhanced bonding between the ribbon and second matrix material, thus providing better compressive strength and toughness. For an equivalent reinforcement packing fraction of rods and ribbons, the ribbons have a surface area that is at least five times greater than that of the rods. Another advantage of ribbons over other cross-sectional shapes such as rods is that they can be bent over curved surfaces to form complex composite structures. For instance, ribbons of thickness from 0.001 inch to less than 0.01 inch can be conveniently bent over 90 degree surface angles whereas rod diameters (thicknesses) are usually at least 0.01 inches and such bending causes fracture.

The fiber and matrix combination should be selected to provide stiffness, toughness, tensile and compression strength to the composite. Stiffness and compression strength of the composite are related to the degree of waviness and alignment of the fibers. The better the fibers are aligned, the greater the stiffness and strength of the composite. Preferably 100%, of the fibers are straightened and aligned. They are held in the desired aligned state by the first matrix material, which remains in the solidified state during the incorporation of these ribbons into the second matrix material or other composite structures.

FIG. 1 is illustrative of the effect of fiber waviness on the stiffness of a dry fiber tow. As seen in FIG. 1, the stiffness of the fiber tow depends on the slope of tensile force applied versus tensile displacement. When the fibers are straight they show the maximum stiffness.

Most high-performance fibers are supplied as multifilament tows that have varying degrees of fiber misalignment and waviness. Normal processing of these tows does not straighten all the individual filaments. Such straightening is necessary to achieve high compression strength and stiffness. Tests were conducted to determine the magnitude of the tension required to straighten all the filaments in a tow. Under small tensile loads of about 1 to 5 lbs, the tow, which contains some wavy fibers, has relatively low stiffness as seen in FIG. 1, point A. As the tow is pulled to higher displacement and force levels, some of the wavy fibers are pulled straight and the stiffness increases as shown by point B in FIG. 1. When all of the fibers were straightened or aligned, thus producing a fully collimated state, as seen at point (C) in FIG. 1, the fiber tow reaches its maximum stiffness.

Using a suitable first matrix material that is cured or solidified after reaching this fully collimated state provides a means to preserve this alignment in the final composite structure and consequently assures its stiffness and stability. In the present invention, stiffness levels approach theoretical values known for each fiber type. For example, with carbon fiber T650/35 seen in FIG. 2, the theoretical stiffness of the fully straightened tow of $3.5 \times 10^7$ psi is attained.

Figure 2:
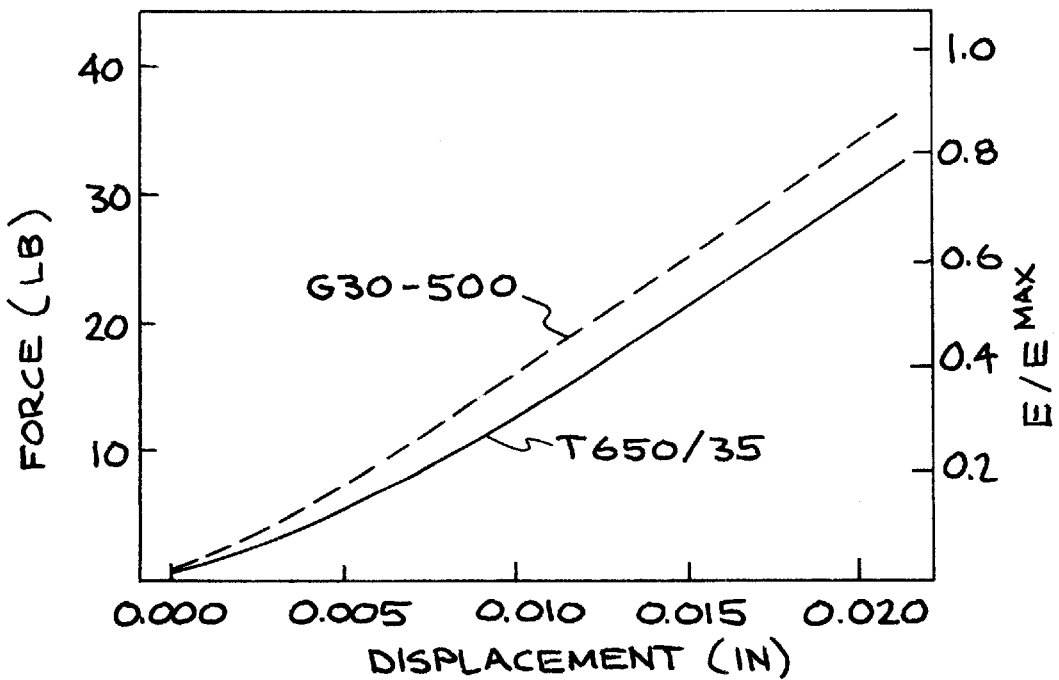
FIG. 2 is a graph illustrating the increase in stiffness due to tensioning in two types of commercial carbon fiber tows.

The fibers are straightened by alignment via tensioning as described above and in Example 1. Different types of fibers require different amounts of force in order to straighten the fibers. In general, the force required to strengthen fibers is in the range of about 1 to about 100 lb, typically, about 10 lb. FIG. 2 illustrates the increase in stiffness due to tensioning for two commercial carbon fiber tows.

By way of example not to be considered to be a limitation, FIG. 2 shows the varying amount of force required for straightening two different carbon fiber tows, designated T650/35 and G30-500, commercially available from Amoco and Toho, Japan. The G30-500 tow is well collimated and requires much less force than the T650/35 to straighten all of the fibers. The increase in slope and therefore increase in stiffness with tensile force for G30-500 compared to T650/35 is apparent.

While over the past twenty years there has been a steady increase in the tensile strength of carbon and glass fiber reinforced composites from $2.0 \times 10^5$ to over $5.8 \times 10^5$ psi, compression strength has remained relatively constant at approximately $2.0 \times 10^5$ psi. Because of this imbalance in properties, the application of these materials has been somewhat limited.

In order to provide overall compression strength as well as stiffness to the hybrid matrix composites, it is important that the fibers in the ribbons are held in alignment. The theoretical relationship for the longitudinal compressive strength of a fiber composite that contains completely straightened filaments is represented by a mathematical model:

$$c = G_m / 1 - V_f$$

where $G_m$ is the matrix shear modulus, i.e., stiffness under shearing and $V_f$ is the fiber volume fraction.

Figure 3:
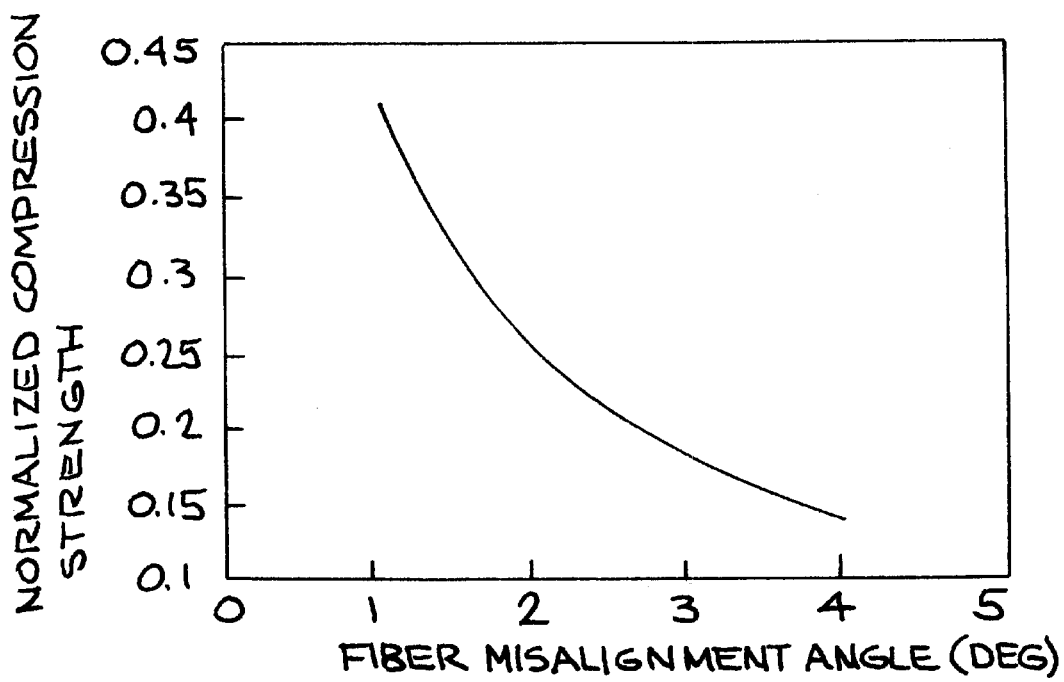
FIG. 3 is a graph illustrating the effects of fiber misalignment angle on compression strength as predicted by a new mathematical model.

In addition, the relationship of misaligned fibers to compression strength is represented by:

$$c = f(G_m, \text{''} V_f)$$

f=function
$G_m$=matrix shear modulus
$V_f$=fiber volume fraction
=misalignment angle FIG. 3 illustrates effects of fiber misalignment angle on compression strength.

As shown in FIG. 3, recent theoretical work has demonstrated that compression strength decreases as fiber misalignment increases. FIG. 3 shows the effect on a normalized compression strength for a typical carbon fiber and epoxy matrix composite. According to the scale, the compression strength would be equal to one for a completely aligned material but when the fiber misalignment angle is higher, compression strength decreases substantially. FIG. 3 shows that the degradation in compression strength is severe even at small fiber misalignment angles (*J. Appl. Mech.*, Vol., 64:1–6, March (1997)).

For a given fiber content, the theoretical composite compression strength is directly proportional to modulus of the matrix that surrounds and supports the fibers. In the present invention, the fibers are impregnated with and held within the hybrid matrix composite by a first matrix material in a manner that maintains fiber alignment and thus increases compression strength. As a result of the present invention, compression strength of at least $2 \times 10^5$ psi, preferably, at least $3 \times 10^5$ psi is attained in the hybrid matrix fiber composites.

Suitable materials for the first matrix are materials that are rigid, when solidified, and confer high compression strength and modulus to the composite. Exemplary first matrix materials include thermoplastics, thermosets, epoxies, inorganic glasses, ceramics, metals and the like.

Prior art fiber composites are fabricated using fiber tows embedded in a single material that is subjected to a single curing or solidification step. In effect, the fibers are distributed within only one matrix material which, when subjected to processing conditions, often leads to a formation of microstructural defects, such as buckling or uneven filament distribution within the tow or poor fiber alignment and therefore have reduced compression strength and stiffness. They lack the combination of toughness and compression strength.

The above disadvantages are overcome by the current invention which comprises ribbon components of impregnated fibers embedded in matrix materials and solidified by a two-step process. The two-step procedure allows for prefabrication of the ribbons where the filaments are evenly distributed and aligned within the first matrix material by either partially or completely solidifying or otherwise curing this matrix material to lock-in fiber alignment. Then, such solidified first material is submitted to a second matrix material and this second matrix material is solidified to form a composite structure.

In this way, much of the distortion of the filament placement and misalignment that occurs in one matrix component is eliminated. The partial or complete solidification of the matrix material within the ribbons helps maintain fiber distribution and alignment during the placement of a second unsolidified matrix between ribbons.

According to the invention, the first matrix material forms an integral, preferably a chemical bond, with the second matrix material. It is essential that the second matrix be positioned between and around the aligned ribbons that have been impregnated and solidified with the first matrix material. The second matrix material confers global toughness on the composite.

Prior to the present invention, there has been a trade-off between toughness and compressive strength of fiber composite. High modulus matrix materials that are typically used in reinforcement articles to provide compression strength have high stiffness and strength but poor toughness. These materials produce a fiber composite having low fracture toughness and poor damage tolerance. Examples of such materials include thermosets, epoxies, inorganic glasses and ceramics. Thus, fracture toughness and damage tolerance suffer as matrix modulus is increased to improve compression strength.

Furthermore, prior art matrix materials that are tough have low stiffness and compression strength. Thus, compression strength is sacrificed in favor of tough matrix materials.

Composite materials that are fabricated with a single matrix material result in a trade-off between compressive performance and fracture toughness in the composite. When the matrix is made of a single material, depending on that material, the single matrix composite is either tough and durable and has a lesser compression strength, or it has higher compression strength and is less tough and durable and more fragile. This has been overcome by the current invention.

Figure 4:
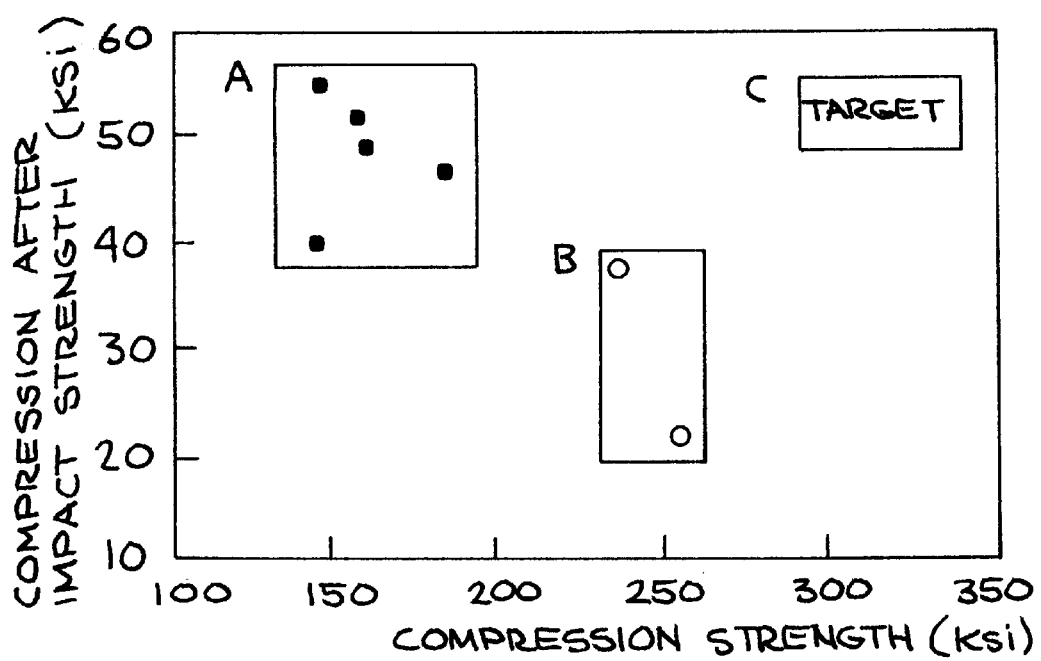
FIG. 4 is a graph illustrating the toughness-compressive strength trade-off of typical existing prior art and hybrid matrix target of the invention composites.

FIG. 4 demonstrates the trade-off of compression strength for toughness in certain prior art composites.

The data seen in FIG. 4 identified by (A) are the solid thermoplastic matrix composites that represent prior art composites made of tough matrix materials. These composites are tough as demonstrated by their ability to maintain a high percentage of compressive strength after an impact. However, they have a relatively low compression strength in the undamaged condition before impact. On the other hand, the data points indicated by (B) represent previous composites made of thermosetting matrix material. These have high compression strength before impact, but because of their low toughness retain very little of this strength after impact.

The present hybrid matrix fiber composites exhibit both high compression strength and toughness because two matrix materials are employed and result in hybrid matrix composite having both the strength and toughness as identified by the "Target" descriptor within the FIG. 4. One matrix material within the fibers of the reinforcing ribbon provides improved compression strength and stiffness. The other matrix material placed between the ribbons offers improved global fracture toughness.

The two matrices comprising the present fiber composites may be the same or preferably are different materials. Exemplary materials suitable as the second matrix material are materials that confer global toughness to the composite including toughened thermoplastics and toughened thermosets and so forth. The materials are chosen such that they are capable of forming bonds, such as chemical bonds, between the first and second matrix materials. The second matrix material is capable of being cured or otherwise solidified such that it bonds with the first matrix material, which is already in a solidified state when it comes in contact with the liquid second matrix material.

The ribbons impregnated with the first matrix material act as the reinforcement for the second matrix material which is placed between and around the ribbons. Where the fibers are preimpregnated and formed into ribbons, as in the present invention, the regions between ribbons are more easily accessible to the second matrix material than where dry fiber tows are used. Dry fiber tows provide only minute spaces within the tow for a matrix to penetrate. The two matrices can also be applied simultaneously using a blend of thermoplastic (TP) particles suspended in a liquid thermosetting (TS) matrix. If the TP particles are chosen to be sufficiently large (e.g., >10 $\mu$m in diameter), then during impregnation of the tensioned tow only the liquid TS matrix penetrates the tow and coats the individual filaments because the large TP particles cannot penetrate the minute spaces between the filaments within a tow. The TP particles are essentially filtered and remain on the surface of the ribbon. The TS matrix is then solidified to maintain alignment and straightness of the filaments. These ribbons, which are coated with TP particles, can then be bonded together to form a composite structure by melting and fusing the TP through the application of heat and pressure.

High-rate production processes for forming fiber composites, such as, for example, resin transfer molding (RTM), are advantageously used. These processes may be improved by using a preform fabricated from impregnated and solidified ribbons where it is easier to get matrix into the mold and is therefore faster. For information on RTM and fiber composite processing see *Engineered Materials Handbook,* Vol. 1, "Composites", ASM International, Metals Park, Ohio, (1987).

Figure 5A:
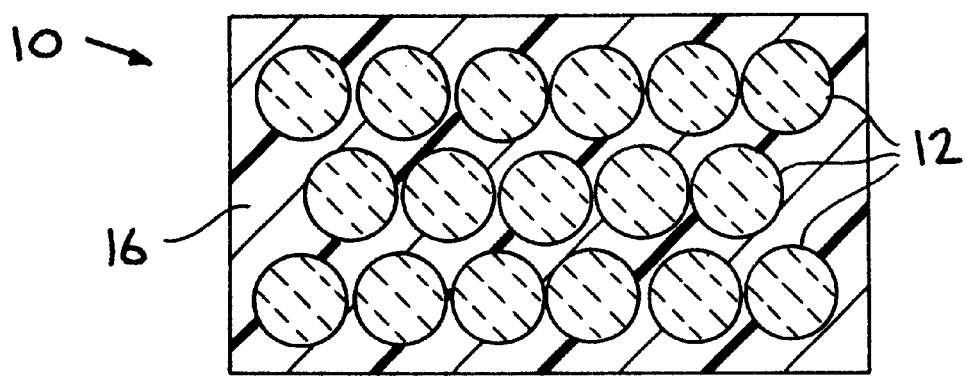
FIG. 5 depicts a general organization, in cross-sectional view, of the microstructure for hybridized matrix composites having circular shaped rods (5A), having rectangularly shaped ribbons (FIG. 5), and the microstructure of an individual ribbon (FIG. 5C).
Figure 5B:
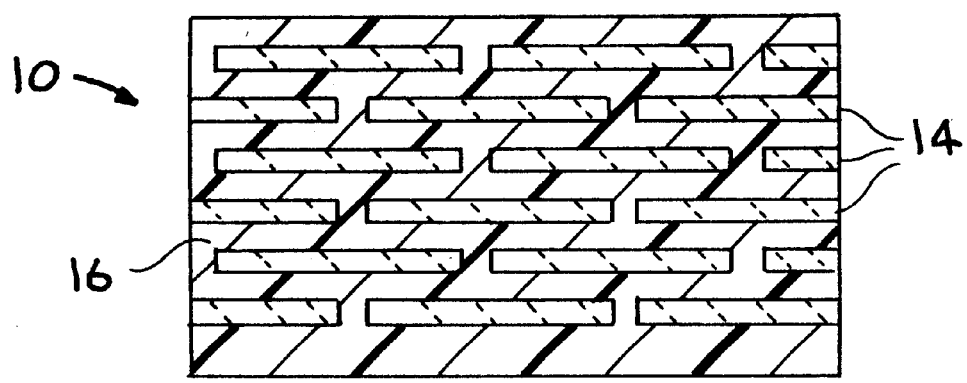

A schematic of a typical microstructure of a hybrid matrix fiber composite in accordance with the present invention is shown in FIG. 5, which depicts a cross-sectional view of microstructure of a hybrid matrix composite comprised of rods having circular cross-sectional shapes (FIG. 5A) and ribbons having rectangular (FIG. 5B) cross-sectional shapes.

FIGS. 5A and 5B show the microstructure of the hybrid composite 10 where the reinforcing rods 12 and ribbons 14, respectively, are distributed throughout the composite 10. The composite 10 comprises a second matrix 16 which is typically made of a tough matrix material in which the rods 12 (FIG. 5A) or ribbons 14 (FIG. 5B) are preferably evenly distributed and embedded.

Rods 12 or ribbons 14 are made of individual fibers 20, preferably evenly distributed within rigid first matrix material 22. During the processing, as described below, the tows composed of multiple filaments are impregnated in the first matrix 22 and the matrix 22 is either completely or partially cured to form a solid or semi-solid. The solidification or semi-solidification of the matrix 22 forms rods 12 or ribbons 14, respectively. Individual rods are then assembled into a shape of a desired composite and surrounded or embedded in the second matrix 16.

Figure 5C:
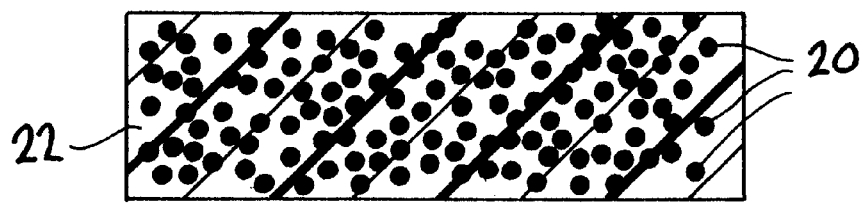

FIG. 5C shows the detailed composition of a portion of the ribbon 14 with fibers 20 embedded in the first matrix material 22. Impregnated ribbons are fabricated into any suitable shape, such as, for example, rectangular cross-section 14.

FIG. 6A shows a sheet or lamina of hybrid matrix composite 30 in accordance with the present invention. The sheet is composed of fiber ribbons 32 with the fibers aligned in one direction and a first matrix impregnated between the fibers of each ribbon. A second matrix is placed between and around the ribbons and defines the shape and size of the sheet or lamina. The sheet or lamina 10 is then used as is or is used in a multilayer composite combined with other commercially available layers, as seen in FIG. 6B.

In FIG. 6B several sheets of hybrid matrix composites are layered next to other reinforcement layers 34 to form a reinforced multilayer composite structure 36. A great number of layer orientations and stacking sequences for the hybrid matrix composites and reinforced layers are possible as long as some hybrid matrix composite is in contact with some reinforced layer.

In general, the percentage by volume of sheets of hybrid matrix composites depends on what properties are desired and is typically about 50 to 100%. Reinforcement layers 34 may have fibers or layers. Typically, these are commercially available or described in a prior art. The fibers in the reinforcement fiber layers are preferably oriented in different directions than the fiber direction in the hybrid matrix composite layer in order to provide additional tensile strength to the structure in the direction of the reinforcement fibers. By way of illustration the second matrix of the hybrid matrix composite layers 30 is made of a material that is compatible, that is, which will bond with the reinforcement layers.

In this manner, the hybrid matrix composite layers provide high compression strength, stiffness and toughness to the multilayer structure. Although the hybrid matrix composites as depicted in FIG. 6 are comprised of ribbons, as mentioned above, other cross-sectional shapes such as aligned circular and, oval rods are also possible.

II. Process to Production of Hybrid Matrix Composites

The methods and process to produce hybrid matrix fiber composites of the present invention typically comprise the following steps.

In the first step, impregnated ribbons are fabricated by impregnating a plurality of aligned fibers containing filaments in a first matrix material. In the second step, the filaments are tensioned while the first matrix is solidified. The third step involves positionally aligning and coating the ribbons with a second matrix material. In the fourth step, the second matrix is cured or otherwise solidified.

The curing may be accomplished in two separate steps or in a single step. Where two steps are employed, a first curing is carried out for the fibers impregnated in the first matrix material to achieve either complete or partial solidification of the first matrix material around the fibers within the ribbon. The second curing step is carried out after the ribbons are embedded in a second matrix material. The first and second matrix materials are cured under conditions that achieve chemical or physical bonding between the two matrices.

In this approach the fibers are impregnated and fully solidified prior to processing into a macroscopic structure using a first matrix material. The completion of the cure chemistry in the presence of the second matrix surrounding the ribbons allows chemical or physical bonds to form between the two matrices, thereby providing for enhanced adhesion. Another processing advantage is the reduction of the cure chemistry exotherm in the final processing step due to two-stage curing. This reduction results from less material reacting during final consolidation and cure and allows faster processing times, especially for thick structures.

Alternatively, the impregnation of the fibers and the subsequent construction of the composite with the second matrix are easily completed in a single process. In the later case, the two matrices are solidified (i.e., cured) together which offers enhanced adhesive bonding between fibers and surrounding matrix.

As already described above, the present method and process are variable and allow for producing hybrid matrix fiber composites having predetermined properties. The impregnated ribbons can be formed into various convenient shapes, prior to applying the second matrix. Each shape lends specific advantages to the resulting composite. Circular cross-section rods offer a large diameter reinforcement for compressive load applications and as the resistance to compressive buckling of the reinforcement phase of a composite is proportional to the fourth power of the radius, the rod form of the impregnated tow offers improvements in composite compressive strength. The ribbon form allows higher packing fraction and therefore more efficient use of the fiber properties as well as an ability to bend to form contoured shapes.

One exemplary method for preparation of hybrid matrix composites in accordance with the present invention is illustrated in FIG. 7.

As seen in FIG. 7, the process begins with fabrication of the ribbons using a plurality of fibers 50. Fibers are initially spun around a spool. The fibers are pulled in tension around rollers 52, where the tow is submerged in resin bath 54 containing a first matrix material 56. The first matrix material is a thermosetting liquid used to bond all filaments of the fibers together into highly collimated ribbons. Due to the advantage that the ribbon composites can be prepared with less thickness than the rods, such spools can have smaller diameters.

In resin bath 54, the fibers are surrounded and coated with the first matrix material. From the resin bath 54 the fibers are drawn through squeeze rollers 58 to remove excess liquid and moved into the oven 60 where the fibers are held under sufficient tension to align the individual filaments of the fibers in the curing oven 60. In oven 60, the fibers are fully or partially cured to become solidified or semi-solidified, respectively, producing an impregnated ribbon.

In general, curing times for the first matrix range from 60 to 480 minutes at temperatures from about 20° to 200° C. are employed to achieve full solidification. Typically, curing which is performed in lesser time achieves partial solidification at temperatures of about 20° to about 200° C. However, the appropriate curing times and temperatures are dependent on the types of materials used and on the amount of solidification of the first matrix desired from the process. Usually, the first matrix is solidified to a level of at least 80%, preferably, at least 90%.

The ribbons are molded into the appropriate shape using dies, rollers or other means (not shown) located in the oven prior to solidifying the first matrix material. The ribbon depicted in FIG. 7 is a rectangular-shaped 62. The fibers in this ribbon are typically 5–10 $\mu$m in diameter and the ribbon is about 0.001 to about 0.10, preferably 0.005 inch thick by less than about 0.10 to 12 inches or greater in width. The impregnated ribbon is then rolled over rollers 52 and submerged in a second matrix material 64 in resin bath 66 where the ribbon is submerged into and coated by the second matrix material 64. The hybrid matrix fiber composite is taken from resin bath 66 and drawn through a squeeze roller 59 in order to remove excess second matrix material and meter the desired amount of material of the hybrid matrix composite 68. The composite 68 is collected and formed into structures by wrapping the composite around mandrel 70. In the alternative, the composite may be placed in a mold in order to consolidate the entire structure, thus process and equipment systems described above are illustrative only. All other equipment systems that lead to production of ribbons and hybrid matrices are also intended to be within the scope of the invention.

The hybrid matrix fiber composite 68 produced as above is subjected to a second curing step to solidify the matrix materials and bond the two matrices together. The second curing step is similar to the first curing step described above and depends on the second matrix material. Typical curing times in the second curing step range from 60 to 480 minutes at temperature from between about 20 to 200° C. The temperature and times will depend on the type of first and second matrix materials used and the degree to which the first matrix was solidified during the first curing step.

Hybrid matrix fiber composites according to the invention represent a new class of fiber composite materials. The method of preparing the composites permits a rational approach to selecting constituents and designing composites for optimum compressive performance, stiffness and toughness.

The process for production of the present hybrid matrix fiber composites provides enabling technology for production of materials useful for applications requiring light weight structural materials exhibiting enhanced compression strength, stiffness, durability and toughness. These improvements provide benefits to transportation, energy, defense and infrastructure industries.

EXAMPLE 1

Production of Hybrid Matrix Composites from Circular-Shaped Rods

This example describes a process for production of hybrid matrix composites from circular-shaped rods.

Thirty feet of a 12,000 filament tow and carbon fiber tow (G30-500) obtained from Celanese Corp., N.J. was wrapped around a spool and placed into a vacuum chamber. The fiber tow was subjected to a vacuum to remove most of the air between the filaments of the tow for 1 hour. A liquid epoxy resin 100 pts by weight CY-179 epoxy resin (Ciba) 100 pts by weight methyl tetrahydrophthalic anhydride (Anhydrides and Chemicals) 10 pts by weight carboxy-terminated butadiene acrylonitrile (B. F. Goodrich) 1 pt. by weight 1-methylimidazole (Aldrich) was then introduced around the fiber in the chamber for a sufficient time for the resin to penetrate the tow for 15 minutes. The vacuum was released and the spool of fiber tow which was impregnated with the epoxy matrix was removed from the chamber.

The spool of tow was then mounted on an axle and pulled though wire-drawing dies to form circular rod shapes. Approximately 3-foot lengths of the rods (10) were clamped at each end and hung with 10 pound weights in a forced air oven. The oven was programmed to allow complete cure of the matrix while the tow was held under the 10 pound tension cured for 2 hours at 90 C., then 4 hours at 150 C.

Rods fabricated by the above described method were tested in compression and have been found to have an average strength of $2.7 \times 10^5$ psi.

The hybrid matrix composite of these rods was fabricated by placing short lengths (5 inches) of the rods into a mold. The spaces between the rods were filled with the same resin as used above to impregnate the tow. The composite was placed into an oven for a sufficient time to completely cure the matrix using the same cure cycle.

In the same manner, other composites are prepared where either the first or second matrix material were substituted with other materials selected from Tables 2 and 3 and where both the first and second materials were either the same or different.

EXAMPLE 2

Production of Hybrid Matrix Composites from Rectangular-Shaped Ribbons

This example describes a process for production of hybrid matrix composites from rectangular shaped ribbons.

Spools of Owens-Corning, Ohio, 52-glass fibers and carbon Toray, Japan, IT700SC carbon fibers were mounted on a creel system series of axles to hold several spools of fiber having a bidirectional tensioning system. Under 10 pounds of tension, the fiber tows were pulled through a standard matrix impregnation bath containing 100 pts DER-332 epoxy (Dow), 45 pts T-403 amine (Texaco), on a McClean-Anderson 6-axis filament winder. The tows were then pulled through squeeze rollers to remove excess liquid matrix from the fiber tows. The tow then continued to be pulled over a series of rollers and onto a plate mandrel to form a rectangular cross-sectional shape. After several windings on the plate mandrel, the tow was cut and tied off in order to maintain the tension level in the tow. The mandrel with the wound tow was then placed in a forced-air oven to cure the matrix material at a temperature of 90 C. for a period of 4 hours. This step resulted in formation of aligned, rectangular-shaped ribbons that were cut to 12 inch lengths.

The ribbons were placed in a mold, which was filled with the same matrix material used above and cured in the same way.

EXAMPLE 3

Production from Alternating Layers of Hybrid Matrix Composites

This example describes production of hybrid matrix composites using alternating layers, and illustrates versatility of the invention in reaching high degree of strength, toughness and durability.

The production of rods or ribbons of hybrid matrix composites were made according to either Example 1 or Example 2 above. The rods or ribbons of Example 1 or 2 were then layered into a mold alternating with layers of preimpregnated carbon fiber tape or dry woven fabric which is available from multiple sources such as Fiberite. Reinforcement in multiple directions was achieved by changing the orientation of the ribbons, tape or fabric with each layer.

The layers were directly or indirectly molded together as desired. Where preimpregnated tape layers were used, the layers were molded directly. Their layers were molded at temperature 150 C. and under pressure. Where dry fabric layers were used, a binder of 100 pts. DER-332 epoxy and 45 pts. T403 amine using standard liquid molding techniques such as resin transfer molding (RTM) were employed.

EXAMPLE 4

Production of Hybrid Matrix Composites from Off-Axis Fibers

This example describes yet another method for production of hybrid matrix composites illustrating its versatility, wherein the method utilizes pultrusion.

For this purpose, ribbons of desirable cross-sectional shape are pultruded and cured according to Example 1 or Example 2 above. Resulting multiple ribbons are then pulled with an off-axis fiber such as fabrics, mat or cloth. The multiple ribbons and off-axis fibers were submitted to a second pultrusion die, to form continuous structures such as tubes and beams. Off-axis reinforcement was applied by combining pultrusion with filament winding to achieve a higher degree of reinforcement in the transverse direction.

Although the foregoing invention has been described in some detail by way of illustration and example for purposes of clarity and understanding, it will be obvious that certain changes of modifications may be practiced within the scope of the appended claims. Certain theoretical discussions have been presented with respect to the instant invention. These theoretical discussions should not be viewed as a limitation with respect to the scope, understanding or practice of the present invention, which has been fully described and enabled above.

What is claimed is:

1. A hybrid matrix fiber composite having improved compressive strength and fracture toughness, said composite comprising:

a plurality of aligned fibers forming at least two ribbons;

a first matrix material impregnating said fibers of said ribbons where the first matrix material is at least partially solidified to preserve the high degree of fiber alignment; and a second matrix material surrounding to embed said ribbon therein to form a solidified composite, and wherein said first and second matrix materials of the composite are integrally bonded together.

2. The composite of claim 1, wherein said first and second matrix materials are bonded chemically or physically.

3. The composite of claim 2, wherein said first matrix material imparts compressive strength and stiffness to said composite.

4. The composite of claim 3, wherein said first matrix material and said second matrix material comprise thermosetting or thermoplastic materials.

5. The hybrid matrix fiber composite of claim 4, wherein said first matrix material is selected from the group consisting of epoxy, bismaleimide, cyanate ester, polyester, vinyl ester and a mixture thereof.

6. The composite of claim 2, wherein said second matrix material imparts fracture toughness to said composite.

7. The composite of claim 6 further comprising a reinforcement packing fraction of said ribbons of greater than 90 volume percent.

8. The composite of claim 3, wherein said second matrix material is selected from the group consisting of polyamide, polyamide-imide, polyarylene ketone, polyarylene sulfide, polyetherimide, polyether ketone, polyethersulfone, polyimide, polyphenylene sulfide and a mixture thereof.

9. The composite of claim 1, wherein said fibers are aligned in a first direction and wherein said composite is surrounded with layers of reinforcement material having a plurality of fibers positioned in other than said first direction, and wherein said layers are in contact with said composite.

10. A hybrid matrix fiber composite comprising:

a plurality of aligned fibers forming at least two ribbons;

a first matrix material in which said fibers of each ribbon are impregnated thereby providing said composite with compressive strength, said first matrix material being at least partially solidified; and a second matrix material surrounding to embed said ribbons therein for forming a solidified composite and providing said composite with fracture toughness, and wherein said first and said second matrix materials are chemically or physically bonded together.

11. The composite of claim 10, wherein said first matrix material or said second matrix material is selected from the group consisting of thermoplastics, thermosets, inorganic glasses, ceramics, or mixtures thereof.

12. The composite of claim 10, wherein ribbons have a thickness of about 0.001 to less than about 0.1 inches.

13. The composite of claim 10, wherein said ribbons comprise a reinforcement packing fraction of at least 90 volume percent.

14. A hybrid matrix composite comprising ribbons and having a compression strength of at least $2\times10^5$ psi.

15. The composite of claim 14 having a stiffness of at least $6\times10^6$ and a toughness of at least 500 $J/m^2$.

16. The composite of claim 14 further comprising preshaped core materials bonded to said composite.

17. A hybrid matrix fiber composite having improved compressive strength and fracture toughness, said composite comprising:

at least two ribbons, each comprising a plurality of aligned fibers impregnated with and embedded in a first matrix material solidified to preserve the high degree of fiber alignment; and a second matrix material surrounding to embed the at least two ribbons therein and thereby form a solidified composite, wherein said first and second matrix materials of the composite are integrally bonded together with the ribbons providing the compressive strength and the second matrix material providing the fracture toughness.

18. The hybrid matrix fiber composite as in claim 17, wherein the at least two ribbons are aligned relative to each other and the solidified second material preserves the ribbon alignment.

* * * * *